United States Patent [19]

Tichy

[11] Patent Number: 4,746,001
[45] Date of Patent: May 24, 1988

[54] APPLE ORIENTING DEVICE

[75] Inventor: Oldrich J. Tichy, Concord, Calif.

[73] Assignee: Atlas Pacific Engineering Company, Pueblo, Colo.

[21] Appl. No.: 928,881

[22] Filed: Nov. 10, 1986

[51] Int. Cl.⁴ ............................................... B65G 47/24
[52] U.S. Cl. .................................................... 198/385
[58] Field of Search ................................ 198/384–387, 198/779; 99/549, 550

[56] References Cited

U.S. PATENT DOCUMENTS

| | | | |
|---|---|---|---|
| 2,980,232 | 4/1961 | Skog | 198/386 |
| 3,563,362 | 2/1968 | Tomelleri | 198/385 |
| 3,738,474 | 6/1973 | Ellis | 198/385 |
| 4,169,528 | 10/1979 | Amstad | 198/385 |

Primary Examiner—Joseph E. Valenza
Attorney, Agent, or Firm—James F. Mitchell

[57] ABSTRACT

This invention relates to an apple orienting device suited to orient apples, particularly those apples which are relatively long as compared to their diameter. The orientor includes a set of rollers which are rotated intermittently and are mounted on a shaft adjacent to one end of an apple carrying receptacle to roll the end of a long apple upwardly so as to orient the apple vertically in the receptacle. The orientor also includes a larger wheel for rotation adjacent to one side of the apple receptacle that has a number of protuberances spaced along its circumference to align the core of apples in the receptacle with the rollers.

2 Claims, 2 Drawing Sheets

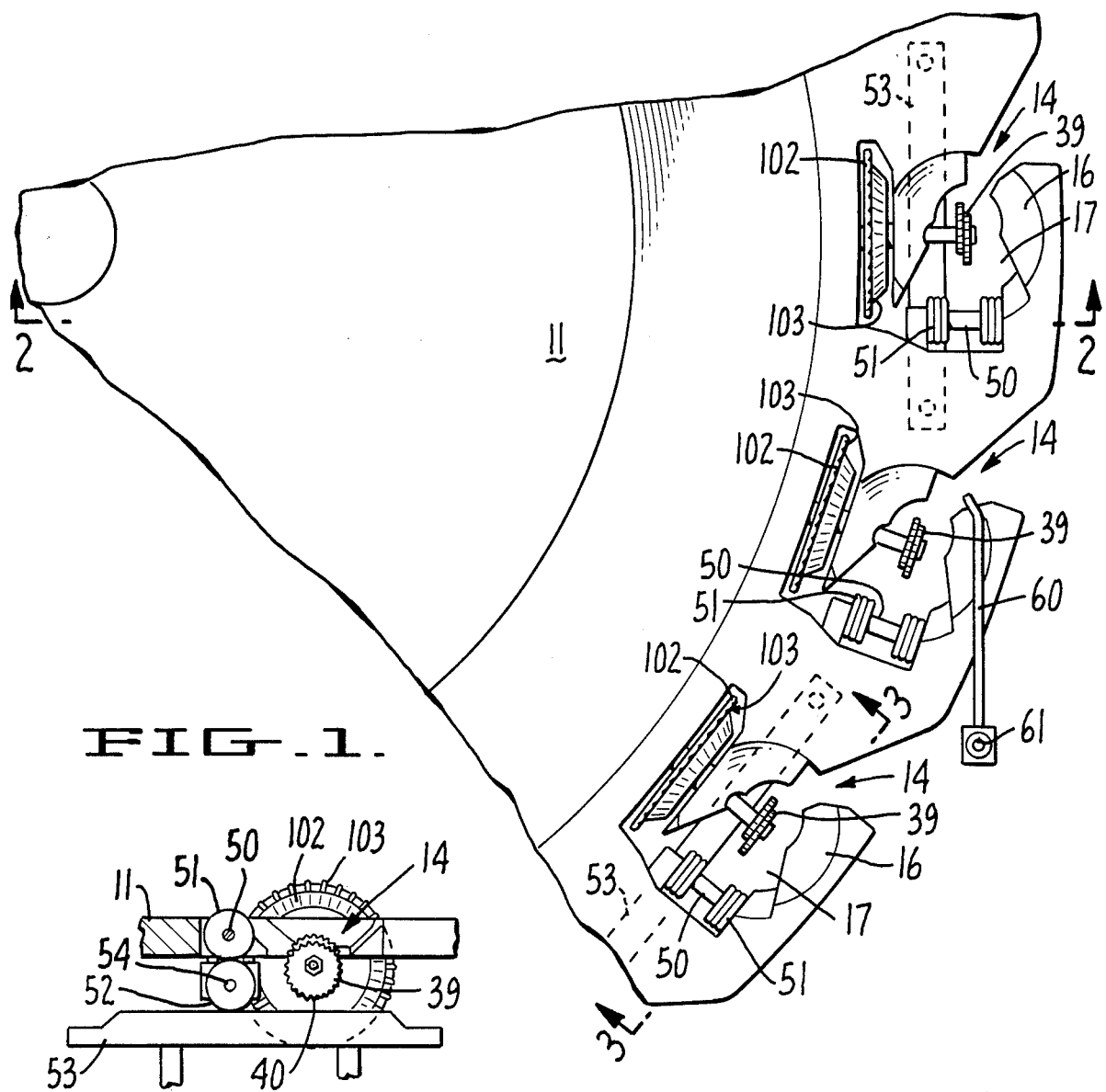
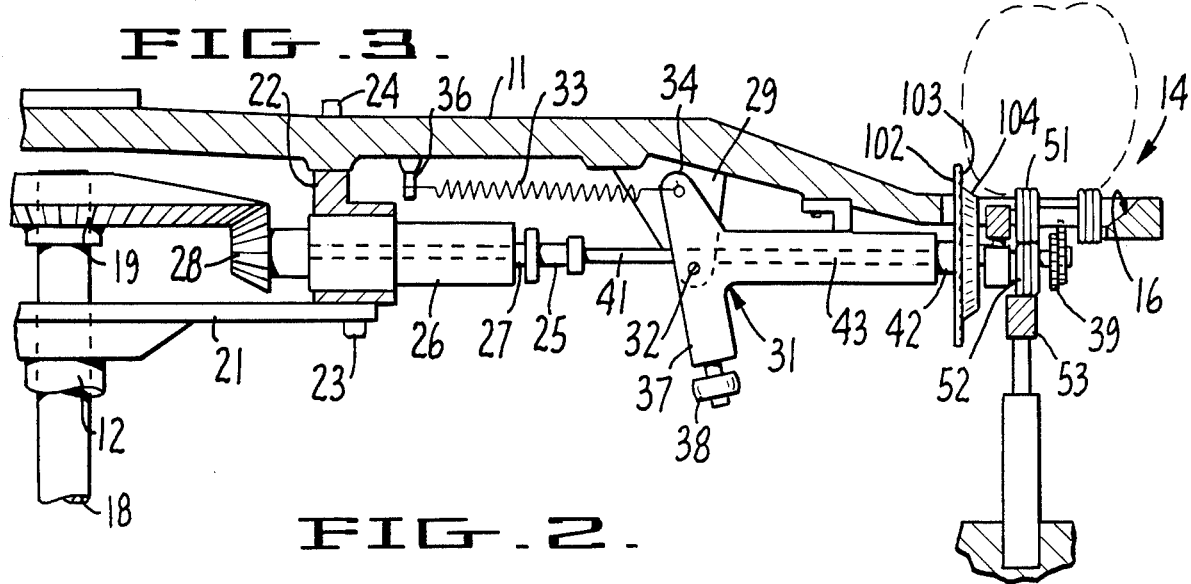

APPLE ORIENTING DEVICE

BACKGROUND OF THE INVENTION

The purpose of the orienting system is to position each apple so that it is at rest with its core extending vertically and with the stem end either up or down. In this position, the apple can be effectively transferred to a machine for peeling and coring the apple such as is shown in U.S. Pat. Nos. 3,586,081 and 3,586,151.

Previous orienting systems employed a series of apple receptacles or cups, each with an eccentrically roating wheel located in the bottom of the cup and spring loaded wire fingers located at various points about the orienting conveyor such as is shown in U.S. Pat. Nos. 3,586,081 and 3,738,474. One orienting system in current use employs a cup having sides that tilt at an angle to a horizontal plane to urge apples against another larger diameter wheel provided on the same shaft as that used to rotate the eccentric wheels. The larger wheel is adjacent to the interior edge of the cup and has a conical face which is rough or knurled as is shown in U.S. Pat. No. 4,169,528.

Apples are fed into each cup in the unoriented position. The larger wheel contacts apples which are situated with their cores horizontal and crosswise in the cup and aligns them by rotating them in a substantially horizontal plane. The rotating eccentric wheels in the bottom of each cup contact the side of the apple and turn it toward a vertical core orientation until the indent of the stem end or blossom end is reached. When the indent is reached, the wheels can no longer touch the apple so the apple remains in the vertically oriented position. The fingers used in the earlier orienting systems aid harder to orient apples by slightly turning them in the cup so the eccentric wheel can turn the apple on a different track, thus enabling the indent to be reached more quickly.

Some problems have been encountered with these systems. The fingers must be constantly adjusted so that they do not disorient an already oriented apple. The eccentric wheels are ineffective to turn some longer shaped apples to a point where their cores extend vertically. The larger wheel does not contact longer apples sufficiently to turn the apples so that the eccentric wheels can orient them. Long apples do not orient well with the previous systems because of their concave sides and their tendency to lay horizontally rather than to stand vertically.

SUMMARY OF THE INVENTION

In accordance with this invention, the larger diameter wheel is provided with a number of protuberances spaced along its circumference. A receptacle or cup is provided similar to the cups used previously. However, an upper shaft containing a number of resiliently faced upper rollers is mounted adjacent to the one end of the receptacle so that the rollers extend partially into and upwardly from the receptacle. A lower shaft containing driver rollers is mounted directly below and spring-biased away from the upper shaft. The two sets of rollers are rotated intermittently by a fixed cam track positioned on the frame under the orienting conveyor. The eccentric wheels, the larger diameter wheel with its protuberances and the upper rollers, when driven, are all rotated in a counterclockwise direction when viewed from outside the orientor. Wire fingers are fixed at various points around the conveyor to urge the passing apples into contact with the larger diameter wheel and its protuberances.

Apples are delivered to each receptacle in an unoriented position. As each passes a wire finger, the finger urges the apple against the rotating larger wheel while the eccentric wheels attempt to turn the apple. Apples which are laying in the receptacle with their cores horizontal and crosswise are rotated in a substantially horizontal plane by contact with the larger wheel and its protuberances to align the fruit core with the direction of conveyor travel. Simultaneously, the eccentric wheels attempt to turn the apple to a vertical core orientation until the wheels reach the indent of the stem or blossom at which point the wheels lose contact with the apple. At the same time the lower rollers are raised intermitently by the cam track. They come into contact with and drive the upper rollers, causing the upper rollers and shaft to rotate, thus aiding the eccentric wheels in turning the apple into a vertical core orientation. When the upper rollers are not engaged by the lower rollers, the upper rollers rotate freely, thus easing the rotation of the apple into a vertical orientation by the eccentric wheels.

It is the broad object of the present invention to provide an improved apple orientor for use with all types of apples, particularly those which are characterized by being relatively long compared to their diameter.

BRIEF DESCRIPTION OF THE DRAWINGS

FIG. 1 is a plan view of a portion of the orienting mechanism showing several receptacles;
FIG. 2 is a section taken along line 2—2 in FIG. 1;
FIG. 3 is a section taken along line 3—3 in FIG. 1.

DESCRIPTION OF THE PREFERRED EMBODIMENT

Figure 4:
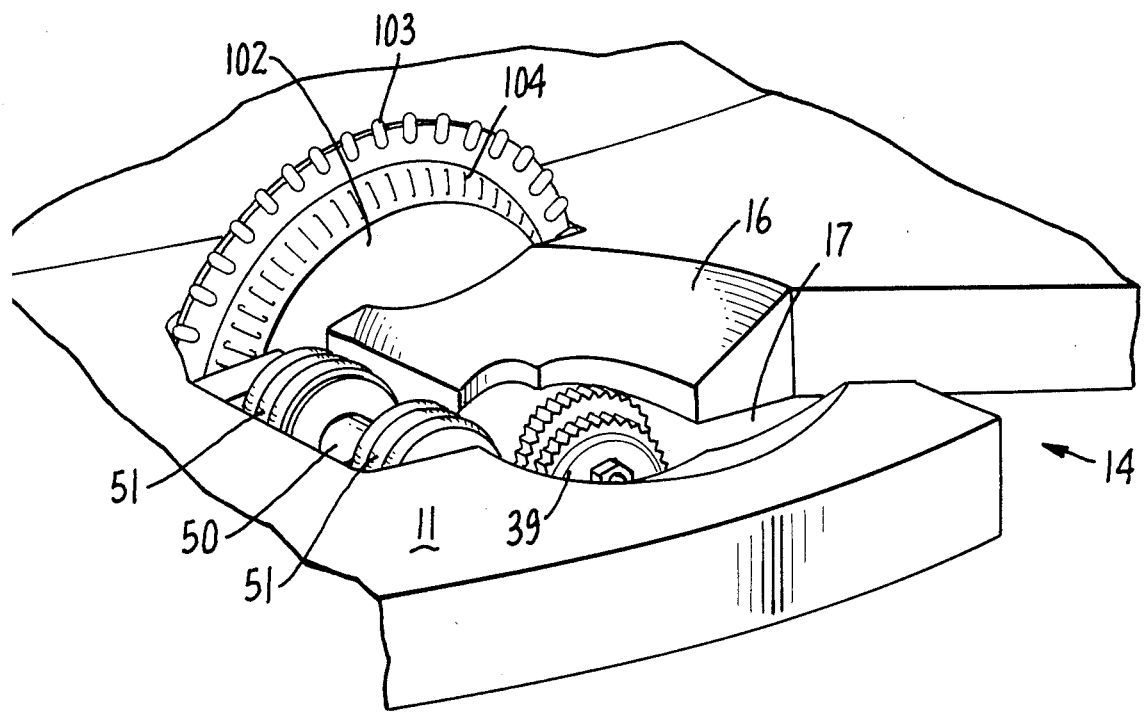
FIG. 4 is a perspective view showing a receptacle including the orienting means of the present invention.
Figure 5:
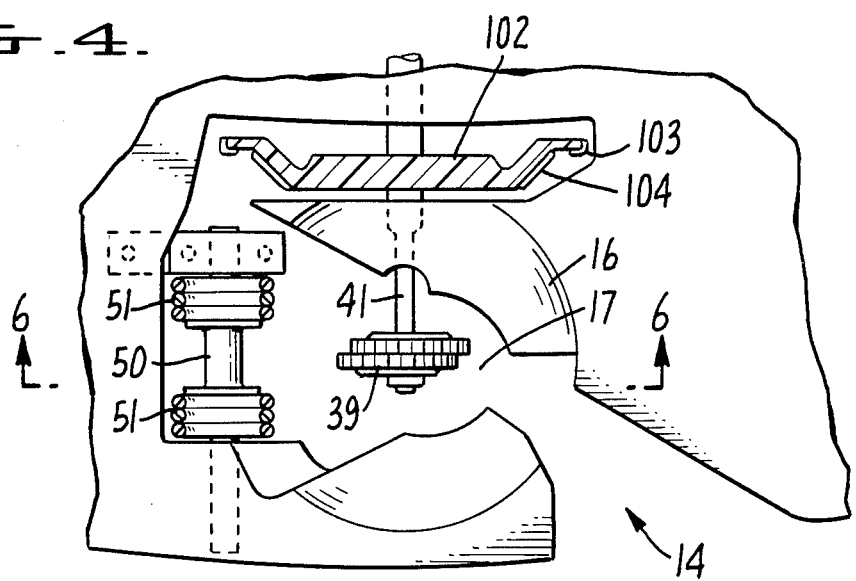
FIG. 5 is a plan view of a receptacle.
Figure 6:
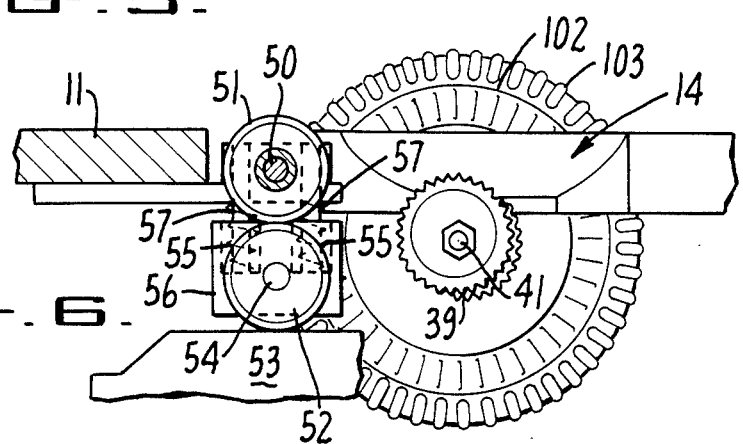
FIG. 6 is a section taken along line 6—6 in FIG. 5.

Referring particularly to FIGS. 1, 2 and 3, a circular conveyor plate 11 is mounted for rotation by a hollow central drive shaft 12. The conveyor plate includes a plurality of apple-carrying receptacles, each generally indicated by 14, and each of which includes a frusto-conical side wall 16 and an open bottom 17. Apples are fed into the receptacles at a feeding station as the conveyor plate turns in a counterclockwise direction as viewed from above.

Mounted on the machine frame below and centrally inside hollow shaft 12 is a shaft 18 carrying a bevel gear 19. A smaller circular plate 21 is provided upon the upper end of shaft 12 and a ring 22, attached to plates 11 and 21 by bolts 23 and 24, supports conveyor plate 11 for rotation with shaft 12. At each location of a receptacle 14, a sleeve 26 supports a shaft 27, having a pinion gear 28 thereon enmeshed with the bevel gear 19 and rotated thereby.

Midway on conveyor plate 11 and again adjacent each receptacle, a plurality of depending ears 29 are provided. A three arm yoke-like lever 31 is mounted on pins 32 on each pair of ears 29. A spring 33 is provided between arm 34 of the lever 31 and a pin 36 depending from the conveyor plate 11 to bias the lever 31 in the position shown in FIG. 2. Arm 37 of the lever 31 includes a roller 38 which engages a cam track (not shown), the cam track being effective to move the lever 31 intermittently downwardly so that eccentric wheels 39 on the end of shaft 41 are moved out of orienting position. The eccentric wheels 39 are preferably mounted off-center on shaft 41 so that they wobble as they rotate in a counterclockwise direction when observed from the free end of shaft 41. Shaft 41 is connected by a flexible cable 25 to the rotating shaft 27. The periphery of the eccentric wheels 39 is knurled as at 40. Shaft 41 is secured in a bearing 42 which extends from the third arm 43 of lever 31. One larger wheel 102, having a conical face 104 which is rough or knurled, is provided on shaft 41 for rotation adjacent to one side of each receptacle 14.

Each set of eccentric wheels 39 is moved out of position between the locations 46 and 48 in FIG. 1 of U.S. Pat. No. 3,738,474 by the cam track so that an oriented apple can be picked up by suitable pickup mechanism which moves over a circular path indicated at 49 in U.S. Pat. No. 3,738,474 and which refines vertical alignment of the indents.

The orienting device so far described is quite successful in orienting apples which have a normal generally round apple shape, but it is only moderately successful with fifty to seventy percent efficiency in handling apples such as the Red Delicious variety, which are relatively elongated and may even have a rounded corner generally five sided cross section.

In accordance with the present invention, the periphery of each larger wheel 102 has a plurality of spaced protuberances 103. The protuberances 103 prevent slippage along wheel 102 when contact is made with an apple having its core horizontal and crosswise in the receptacle. The more effective contact provided by the protuberances results in better rotation of such an apple in a horizontal plane. Spring loaded fingers 60 are provided along the path of the receptacles to urge the apple therein against each larger wheel 102 which is rotating in a counterclockwise direction as viewed from the free end of shaft 41. Each larger wheel 102 with protuberances 103 can then complete the turning of an apple whose core is horizontal and somewhat crosswise in the receptacle.

Further in accordance with this invention, a set of upper rollers 51 is mounted on shaft 50 rotatably mounted adjacent to one end of each receptacle 14. The upper rollers 51 are resiliently faced and are of such diameter so as to extend above the side wall of the receptacle a suitable distance to contact an apple therein. A complimentary set of driver rollers 52 is mounted on shaft 54 which is rotatably mounted directly below the upper rollers 51 and shaft 50. The drive roller mounting 56 is attached to the conveyor plate 11 by supports 57 so that it may move vertically and the drive rollers 52 are biased away from the upper rollers 51 by spring 55. A fixed cam track 53 is located below the conveyor plate 11 so as to engage the drive rollers 52 intermittently, such as three one second intervals in 90° of conveyor rotation, to push them up into contact with the upper rollers 51, thereby imparting a counterclockwise rotation on the upper rollers 51 as the conveyor plate 11 turns counterclockwise as viewed from above. The counterclockwise rotation of upper rollers 51 helps rotate an apple which is unoriented but out of contact with eccentric wheels 39 due to the shape of an elongated apple. When cam track 53 is not engaging the drive rollers 52, the upper rollers 51 and shaft 50 rotate freely, thereby easing the rotation of the apple by eccentric wheels 39.

The improved orientor described above increases the efficiency for orienting long apples such as Red Delicious variety by about fifteen percent. Efficiency of prior art orientors has been in the range of fifty-five to seventy percent on such apples.

The invention is defined in the following claims.

I claim:

1. In combination with a fruit orientor including a support movable over a path in a horizontal plane, at least one receptacle in said support having an open bottom and a frusto-conical side wall, a first shaft rotatably mounted on the underside of said support and extending to a position below the open bottom of said receptacle, and a first eccentric wheel mounted on said first shaft for rotation in a vertical plane in said open bottom, the improvement which comprises:
    (a) a second shaft rotatably mounted in said support adjacent to one end of said receptacle and parallel to said first shaft;
    (b) a plurality of upper rollers rigidly mounted to said second shaft, said upper rollers being of a diameter such that their periphery extends into and above the receptacle so as to engage a fruit therein;
    (c) means for rotating said second shaft and upper rollers intermittently including
    (d) a set of driver rollers mounted below said upper rollers;
    (e) resilient means for biasing said drive rollers away from said upper rollers; and
    (f) a cam track adapted to intermittently urge said drive rollers up into contact with said upper rollers whereby said upper rollers are rotated.

2. A fruit orientor as in claim 1 further comprising
    (g) a second larger wheel mounted on said first shaft for rotation adjacent one upper edge of said receptacle and having a plurality of protuberances spaced along its circumference to orient a fruit with its core in alignment with said upper rollers.

* * * * *